United States Patent
Mitra

(10) Patent No.: US 6,653,970 B1
(45) Date of Patent: Nov. 25, 2003

(54) MULTI-STATIC UAV RADAR SYSTEM FOR MODE-ADAPTIVE PROPAGATION CHANNELS WITH OBSCURED TARGETS

(75) Inventor: Atindra Mitra, Kettering, OH (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 0 days.

(21) Appl. No.: 10/295,551

(22) Filed: Nov. 12, 2002

(51) Int. Cl.[7] .............................. G01S 13/88; G01V 3/12
(52) U.S. Cl. .......................... 342/22; 342/59; 342/191; 342/357.09
(58) Field of Search ............................... 342/22, 25, 52, 342/58, 59, 90, 179, 190, 191, 357.06, 357.08, 357.09

(56) References Cited

U.S. PATENT DOCUMENTS

| | | | |
|---|---|---|---|
| 5,534,866 A | | 7/1996 | Rose |
| 5,716,032 A | * | 2/1998 | McIngvale ................. 244/185 |
| 5,904,724 A | * | 5/1999 | Margolin .................... 701/120 |
| 6,130,705 A | | 10/2000 | Lareau et al. |
| 6,266,142 B1 | | 7/2001 | Junkins et al. |

OTHER PUBLICATIONS

"Integrated design of synthetic aperture radars for unmanned aircraft", Vesecky, J.F.; Cornwall, J.M.; Geoscience and Remote Sensing Symposium, 1996. IGARSS '96. 'Remote Sensing for aSustainable Future.', Int'l, Vol:4 , May 27–31, 1996, Ps: 2347–2348.*

"The changing world, the changing nature of conflicts: a critical role for military radar", Delaney, W.P.; Radar Conference, 1995 Record of the IEEE 1995 International, May 8–11, 1995 Page(s): 11–15.*

"The Global Hawk UAV Australian deployment imaging radar sensor modifications and employment for maritime surveillance", Stacy, N.J.S.; Craig, D.W.; Staromlynska, J.; Smith, R.B.; IGARSS '02. 2002, Vol: 2, Jun. 24–28, 2002 Ps: 699–701.*

* cited by examiner

Primary Examiner—John B. Sotomayor
(74) Attorney, Agent, or Firm—Gina S. Tollefson; Gerald B. Hollins; Thomas L. Kundert

(57) ABSTRACT

Bistatic radar compatible for investigating the employment of a high-altitude UAV working in tandem with a group of low-altitude UAVs. The bistatic radar is divided into a position-adaptive bistatic mode and a close-range monostatic mode. In position-adaptive (robotic) bistatic mode, each low-altitude UAV estimates a new parameter denoted as the differential path length to adaptively implement self-adjustments in position. This approach provides each UAV with the potential for looking down the "throat" of an obscuration channel. In the event that a particular low-altitude UAV detects an obscuration channel, the low-altitude UAV will transfer to a close-range monostatic mode in an effort to interrogate the obscuration channel for targets.

20 Claims, 4 Drawing Sheets

Approximation for Field Pattern by Modeling Channel as Radiation from Open-Ended Rectangular Waveguide

MULTI-STATIC UAV RADAR SYSTEM FOR MODE-ADAPTIVE PROPAGATION CHANNELS WITH OBSCURED TARGETS

RIGHTS OF THE GOVERNMENT

The invention described herein may be manufactured and used by or for the Government of the United States for all governmental purposes without the payment of any royalty.

BACKGROUND OF THE INVENTION

Conventional techniques for detecting obscured targets employ some form of "human intelligence" where "a priori" information is gathered over a period of time by one of the intelligence agencies. If a threat is detected as a result of these intelligence gathering procedures, military or paramilitary forces are often employed at the risk of injury. In extreme cases even loss of life may be incurred. Also, expensive equipment may become severely damaged or unrecoverable.

On the technology forefront, advanced Automatic Target Recognition (ATR) research in the last decade or so has been focused on developing Synthetic Aperture Radar (SAR) and Electro-Optics (EO) along with other imaging technologies for specific reconnaissance and surveillance platforms. Recent advances have lead to a limited number of automated techniques for detecting targets in open terrain and over a limited number of benign conditions. For situations that require the detection of obscured targets, recent initiatives such as development efforts for Foliage Penetration (FP) and Ground Penetrating Radar (GPR) show promise as future technologies to detect targets within forest clutter and obtain signal information from underground facilities, respectively. At present, these technologies have a great deal of scope for further development and are not fully mature for even initial implementation. Realistic possibilities for near-term exploitation of these technologies require a considerable amount of human-in- the-loop intervention to combine information from a variety of sources.

Most existing approaches to advanced airborne sensor research, as briefly described in the previous paragraph, operate at a considerable stand-off range. By contrast, the system concept of the invention uses "smart" or "robotic" low-altitude UAV's with on-board processing capabilities that allow the small UAV to adaptively self-position or converge to a region-of-interest that, for example, contains obscured targets via the deployment of relatively inexpensive platforms without exposing personnel to dangerous situations. Potential applications include important military as well as environmental monitoring scenarios.

This low-altitude "robotic" UAV technology has important applications for emerging and future threat scenarios in hard urban environments where, for example, "objects of interest" may be concealed between buildings as well as other challenging environments such as, for example, surveillance and interrogation of regions-of-interest that may be embedded within mountainous terrain. The multi-static radar UAV system concept of the invention utilizes unmanned low-altitude "robotic" UAV sensors that provide intelligence information for these challenging emerging and future threat environments.

Specifically, the present invention provides a new bistatic/multistatic radar system concept for purposes of interrogating difficult targets with low-altitude "smart" or "robotic-type" UAV platforms. One of the novel aspects is the development of a UAV system concept that implements self-adaptive positional adjustments based on sensed properties of the propagation channel. This aspect is based on signal differential path length analysis for purposes of isolating regions where targets are potentially obscured and difficult to detect via conventional techniques.

SUMMARY OF THE INVENTION

A new bistatic radar concept utilizing a high-altitude UAV that works in tandem with a group of low-altitude UAVs. The concept is divided into a position-adaptive bistatic mode and a close-range monostatic mode. In position-adaptive (robotic) bistatic mode, each low-altitude UAV estimates a new parameter denoted as the differential path length to adaptively implement self-adjustments in position. This approach provides each UAV with the potential for looking down the "throat" of an obscuration channel. In the event that a particular low-altitude UAV detects an obscuration channel, the low-altitude UAV will transfer to a close-range monostatic mode in an effort to interrogate the obscuration channel for targets.

It is therefore an object of the invention to provide a multi-static radar system concept for interrogating difficult targets with low-altitude "smart" UAV platforms.

It is another object of the invention to provide the capability to isolate regions where targets are potentially obscured and difficult to detect via conventional techniques.

It is another object of the invention to provide interrogation of difficult and obscured targets via the deployment of relatively inexpensive platforms without exposing personnel to dangerous situations.

It is another object of the invention to provide a UAV system concept that implements self-adaptive positional adjustments based on sensed properties of the propagation channel.

These and other objects of the invention described in the description, claims and accompanying drawings are achieved by multi-mode, radar method for detecting targets in difficult and obscured environments comprising the steps of:

transmitting a signal through a channel from a high altitude unmanned air vehicle;

passively receiving said signal from said transmitting step through a plurality of unmanned air vehicles at a low altitude platform relative to said unmanned air vehicle from said transmitting step, determining a differential signal time delay from a time said signal is transmitted at said transmitting step and a time said signal is received at said receiving step, said differential time delay indicating a differential time path obstruction between said high altitude unmanned air vehicle and said unmanned air vehicle at said low altitude platform;

monitoring said signal time delay by said low altitude platform unmanned air vehicles and converging to a point that corresponds to a minimum time delay; and detecting targets within said differential time path at said point of minimum time delay by an unmanned air vehicle at a low altitude platform.

BRIEF DESCRIPTION OF THE DRAWINGS

FIG. 2b shows the axis for the model of FIG. 2a.

DETAILED DESCRIPTION

A new bistatic radar concept compatible for investigating the employment of a high-altitude UAV that works in tandem with a group of low-altitude UAVs. This concept is divided into a position-adaptive bistatic mode and a close-range monostatic mode. In position-adaptive (robotic) bistatic mode, each low-altitude UAV estimates a new parameter denoted as the differential path length to adaptively implement self-adjustments in position. This approach provides each UAV with the potential for looking down the "throat" of an obscuration channel. In the event that a particular low-altitude UAV detects an obscuration channel, the low-altitude UAV will transfer to a close-range monostatic mode in an effort to interrogate the obscuration channel for targets.

The bistatic radar of the invention is useful for applications that require the detection of difficult and obscured targets. For such applications, the bistatic radar is based on an adaptive bistatic mode that isolates channels, cavities, and other possible obstructions to the radar receiver line-of-sight. Then, after an obstructed region is detected via this position-adaptive bistatic concept, a low-altitude UAV platform (or in the general case a tandem of low-altitude UAV platforms) is operated in a close-range monostatic mode to look down the "throat" of the obstruction and interrogate the obstructed channel for possible targets.

Figure 1:
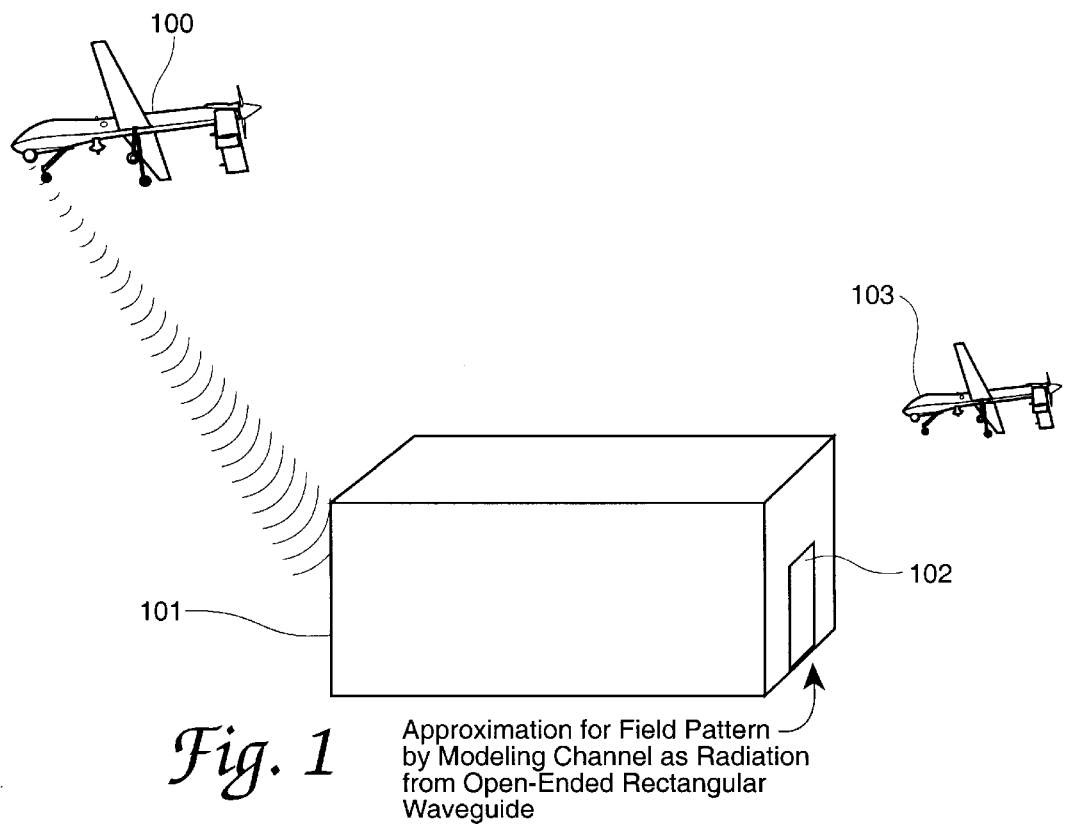
FIG. 1 shows notational geometry for bistatic multipath exploitation.
Figure 2A:
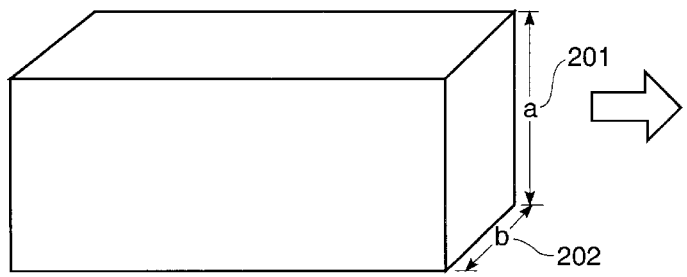
FIG. 2a shows an open-ended rectangular wave guide model for the channel of FIG. 1.
Figure 2B:
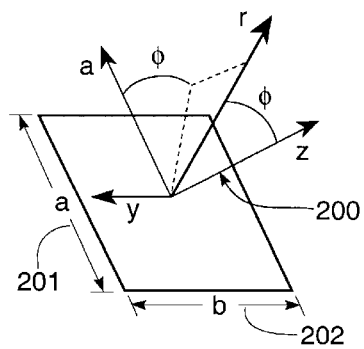

An analysis is initiated by considering the sample geometry in FIG. 1. In FIG. 1, a notional scenario is depicted where a high-altitude UAV 100 irradiates a region with a rectangular channel, or tunnel 101. A low-altitude UAV 103 is located on the other side of this channel 102. Some characteristics with regard to the nature of the signal differential path length delay that is measured at a test point located at the low-altitude UAV can be derived by modeling the channel as an open-ended wave guide. This concept is formulated and the analysis is performed by defining a signal differential path length delay parameter that is embedded in an approximate closed form solution for the radiation pattern of an open-ended rectangular wave guide. The coordinate system for the electromagnetic field calculations and the radiation pattern analysis is shown in FIGS. 2a and 2b. FIG. 2a represents a rectangular wave guide with the y-axis shown at 202 and the x-axis shown at 201 in both FIGS. 2a and FIG. 2b and the z-axis shown at 200 in FIG. 2b only.

Approximate expressions for the radiated field pattern from the tunnel can be obtained via application of physical optics approximations as outlined in Eq. 1. Equation 1 represents the y-component of the radiated field, represented at 200 in FIG. 2b, from the high-altitude platform that is incident on one side of the tunnel.

$$E_{incident} = (0, E_0, 0) \qquad \text{Eq. 1}$$

For this case, the field patterns can be calculate from the y-component of the aperture pattern factor for the open-ended rectangular wave guide as follows.

$$E_\theta(r, \theta, \phi) = jk \frac{\exp(-jkr)}{2\pi r} P_y(\theta, \phi) \sin(\phi) \qquad \text{Eq. 2}$$

$$E_\phi(r, \theta, \phi) = jk \frac{\exp(-jkr)}{2\pi r} P_y(\theta, \phi) \cos(\phi) \cos(\theta) \qquad \text{Eq. 3}$$

This aperture pattern factor can be calculated by integrating the field across the open-ended aperture.

$$P_y(\theta, \phi) = \int_{-a/2}^{a/2} \int_{-b/2}^{b/2} E_0 \exp[jkr] dx dy \qquad \text{Eq. 4}$$

$$= \int_{-a/2}^{a/2} \int_{-b/2}^{b/2} E_0 \exp[jk(x\sin\theta\cos\phi + y\sin\theta\sin\phi)] dx dy$$

Substitution of equation 4 into equations 2 and 3 yields approximate expressions for the radiated fields.

$$E_\theta(r, \theta, \phi) = \qquad \text{Eq. 5}$$
$$jk \frac{\exp(-jkr)}{2\pi r} E_0 ab \sin\phi \, \text{sinc}\left(\frac{ka}{2}\sin\theta\cos\phi\right) \text{sinc}\left(\frac{kb}{2}\sin\theta\sin\phi\right)$$

$$E_\phi(r, \theta, \phi) = \qquad \text{Eq. 6}$$
$$jk \frac{\exp(-jkr)}{2\pi r} E_0 ab \cos\theta\cos\phi \, \text{sinc}\left(\frac{ka}{2}\sin\theta\cos\phi\right) \text{sinc}\left(\frac{kb}{2}\sin\theta\sin\phi\right)$$

$$\text{where sinc}(x) = \frac{\sin(x)}{x}$$

An expression for the y-component of the electric field can be calculated by implementing a coordinate transformation as follows and the time-harmonic term, $\exp(j\omega t)$, is applied in Eq. 8 to observe the time dependence of the propagating wavefront.

$$E_y = E_\theta \cos\theta\sin\phi + E_\phi \cos\phi \qquad \text{Eq. 7}$$
$$= jk \frac{\exp(-jkr)}{2\pi r} E_0 ab \cos\theta \cdot \text{sinc}\left(\frac{ka}{2}\sin\theta\cos\phi\right) \text{sinc}\left(\frac{kb}{2}\sin\theta\sin\phi\right)$$

$$E_y(t) = \left[jk \frac{1}{2\pi r} E_0 ab \cos\theta\right] \cdot \qquad \text{Eq. 8}$$
$$\left[\text{sinc}\left(\frac{ka}{2}\sin\theta\cos\phi\right) \text{sinc}\left(\frac{kb}{2}\sin\theta\sin\phi\right)\right] \cdot \exp(j(\omega t - kr))$$

$$kr = \frac{\omega}{c} \equiv \omega \Delta t_{delay} \qquad \text{Eq. 9}$$

$$\Delta t_{delay} = \frac{r}{c} = \frac{\sqrt{y^2 + (x_p^2 + z_p^2)}}{c} \qquad \text{Eq. 10}$$

Figure 3:
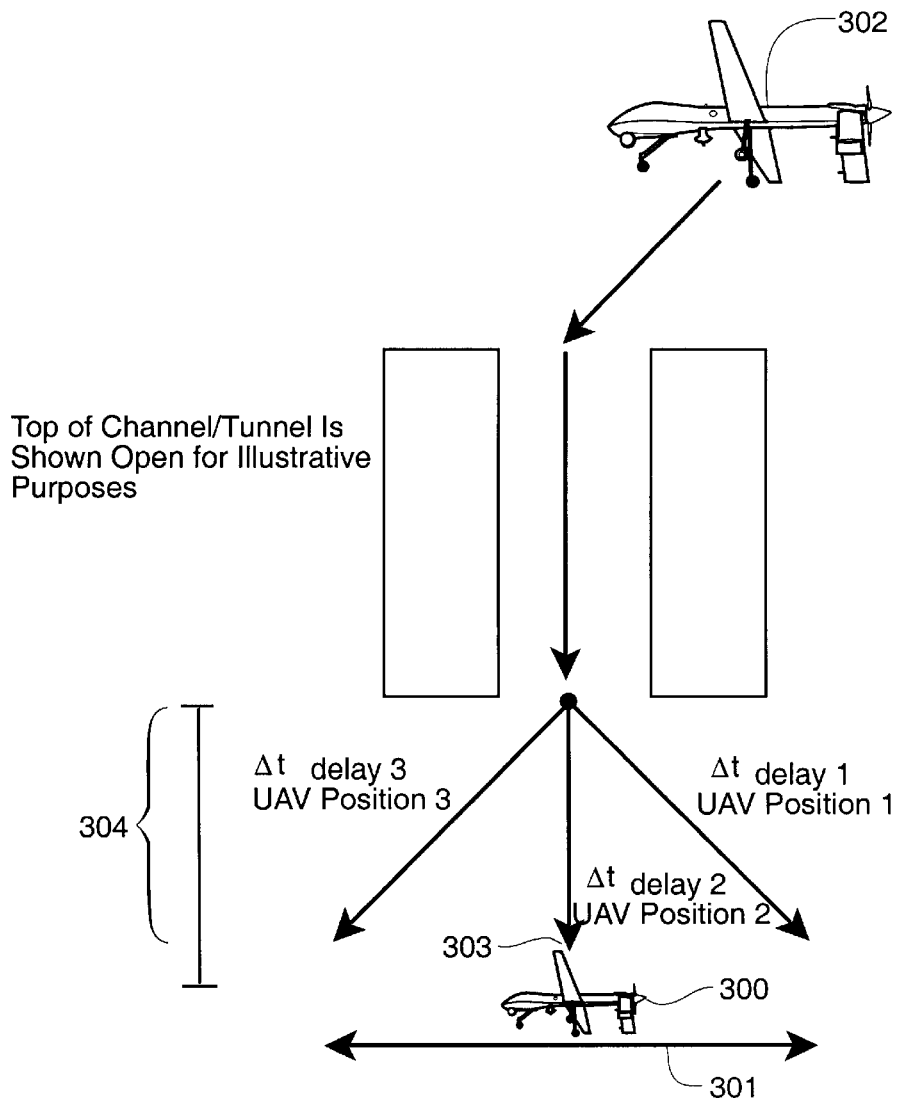
FIG. 3 shows a two-dimensional top view of relative differential time delay measurement at low altitude UAV.

FIG. 3 shows a two-dimensional top view of relative differential time delay measurement at low altitude UAV. As illustrated in FIG. 3, this parameter represents the relative differential time delay between the high-altitude UAV and the low-altitude UAV as the low-altitude UAV moves along the y-axis.

Figure 4:
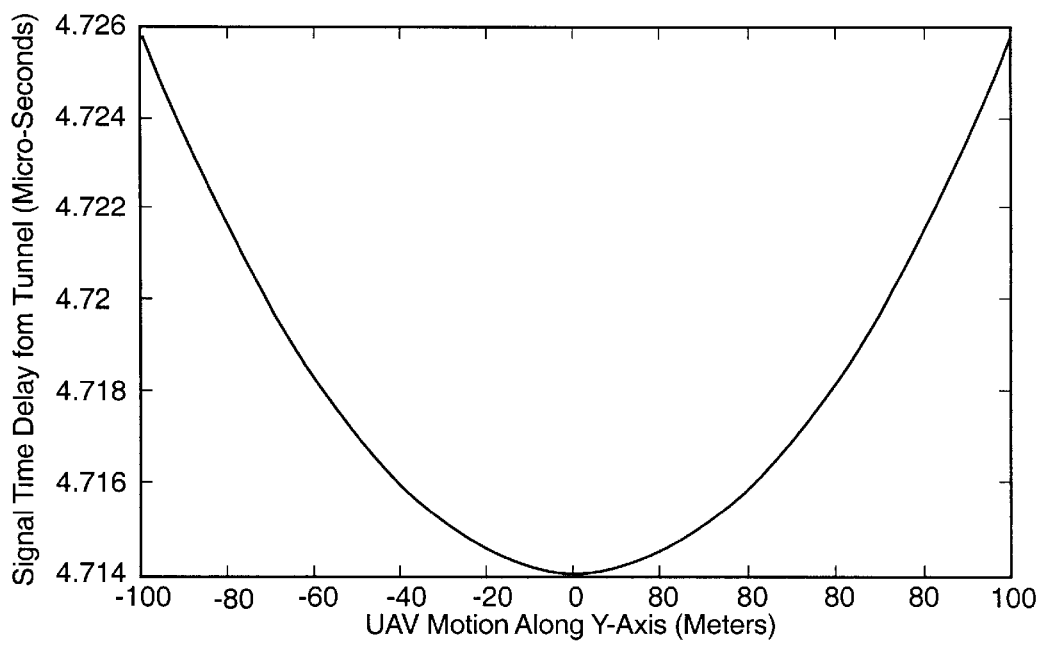
FIG. 4 shows a plot of relative signal differential time delay for low-altitude UAV Motion along the Y-axis.

Under the notational geometry of FIG. 3, the low altitude UAV 300 moves back and forth along the y-axis 301 and measures the signal time delay between the transmitted signal at the high-altitude UAV 302 and the $E_y$ component of the electric field (Eq.7) at the aperture 303 of the low-altitude UAV 300. The relative time delay, in Eq.12, between the tunnel opening and the low-altitude UAV is plotted in FIG. 4 for $x_p$=1 km and $z_p$=1 km with the signal time delay plotted on the x-axis at 400 and the UAV motion along the y-axis at 401. Observation of the profile of this curve illustrates the concept behind this notional bistatic system: the low-altitude UAV monitors the signal time delay and converges to the point that corresponds to the minimum time delay. Then, the low-altitude UAV is positioned to look straight down the "throat" of the tunnel and interrogate the tunnel for targets.

System Models Position-Adaptive Bistatic Mode

Analysis of some design tradeoffs and the formulation of some basic system specifications for this mode can be initiated by performing a basic link-budget analysis. A basic analysis can be initiated by considering the transmitter power, $P_t$, and antenna gain, $G_t$, for high-altitude radiating UAV 100 in FIG. 1. Then, an expression for the incident field at the input to the channel can be derived as follows:

$$\left(\frac{P_t G_t}{4\pi R^2}\right) = \frac{E_0^2}{\eta} \qquad \text{Eq. 11}$$

$$E_0 = \sqrt{\frac{\eta P_t G_t}{4\pi R^2}} \qquad \text{Eq. 12}$$

where $\eta$=377Ω is the radiation resistance of free space and R is the distance from the high-altitude UAV to the input of the channel. Eq.12 can be substituted into Eq. 7 to generate an expression for $E_y$ as a function of high-altitude UAV power and antenna gain parameters.

$$P_r = \frac{E_y^2}{\eta} A_e = \frac{E_y^2}{\eta}\left(\frac{\lambda^2 G_r}{4\pi}\right) \qquad \text{Eq. 13}$$

where $G_r$ is the antenna gain for the low-altitude UAV receiver aperture and λ is denoted as signal wavelength. The system and geometrical parameters that are embedded in Eqs.11–13 can be iteratively computed for receiver system design feasibility and synthesis analysis purposes as a function of critical system design parameters such as signal frequency in relation to the dimensions of the obscuration structures as well as the system noise and interference levels. Approaches to maintaining signal coherence between the transmitted and received signal include synchronization methods that sample the direct path signal from the high-altitude UAV to the low-altitude UAV and synchronization methods that determine the location of the receiver with respect to the transmitter via GPS data. A GPS-based arrangement of the invention is probable in the near future.

System Models for Close-Range Monostatic Interrogation Mode

Figure 5A:
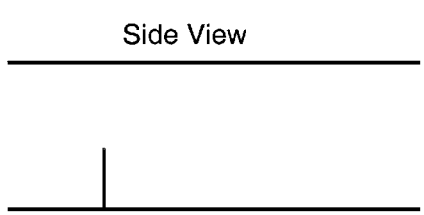
FIG. 5a shows a side view of thin diaphragm as target model for analytical sample calculations.
Figure 5B:
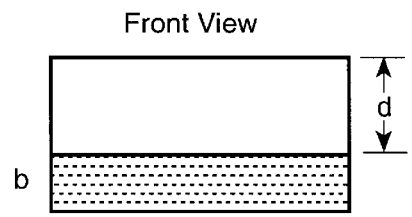
FIG. 5b shows a front view of thin diaphragm as target model for analytical sample calculations.

Once the UAV (or UAVs) are lined up to look down the "throat" of an obscuration channel, this system concept defines a close-range monostatic interrogation mode for purposes of detecting objects of interest within the obscuration channel. Once approach to making some approximate calculations for the backscattered field from a target inside an obscuration channel can be formulated by adapting some analytical equations from the field of "wave guide impedance matching". Some known "wave guide impedance matching" techniques involve placing a thin diaphragm of a given cross-section at a particular location in the wave guide. For example, FIG. 5a illustrates a side and FIG. 5b a front view of a particular geometry for a thin diaphragm. An approach to deriving expressions for the electromagnetic fields in a wave guide is based on modeling wave guides and impedance matching elements, such as the diaphragm of FIG. 5, with analogous circuit elements. An approximate expression as a result of modeling this thin diaphragm as a reactive circuit element is given in Eq. 14. This expression represents the normalized susceptance for a shunt capacitive model for a thin diaphragm of cross-section a*b.

$$Y = \frac{1}{Z} = \frac{4\beta b}{\pi}\left[\ln\csc\left(\frac{\pi d}{2b}\right)\right] + \left(\frac{\pi}{b\gamma_1} - 1\right)\cos^4\left(\frac{\pi d}{2b}\right) \qquad \text{Eq. 14}$$

where $\beta = [k^2 - (\pi/a)^2]^{1/2}$ and $\gamma_1 = \{(\pi/b)^2 - \beta^2\}^{1/2}$.

Using the model of Eq. 14, the reflection coefficient at the object can be calculated as follows:

$$\Gamma = \frac{Z - Z_{TE}}{Z + Z_{TE}} \qquad \text{Eq. 15}$$

where, for purposes of this analysis, $Z_{TE}$ is the wave impedance of the wave guide dominant $TE_{10}$ mode given by:

$$Z_{TE} = \frac{\omega\mu_0}{\left[\omega^2\mu_0\varepsilon_0 - \left(\frac{\pi}{a}\right)^2\right]^{1/2}} \qquad \text{Eq. 16}$$

where ω, $\mu_0$, and $\epsilon_0$ represent the radian frequency of the transmitted signal, the permeability of space, and the permittivity of free space, respectively.

The corresponding receiver feasibility and design for this mode can be performed in a similar manner as in Section 2.1 by calculating the incident field, $E_0$, from power and antenna gain parameters for the low-altitude UAV. The reflected field, $E_0$, can be calculated using Eq. 15 and then Eq. 8 can be applied to calculate the electric field at the low-altitude UAV. The received power can be calculated from Eq. 13 to initiate the design synthesis and analysis process for this mode.

SOME ADDITIONAL GEOMETRIES OF INTEREST

The description of the invention thus far is based on the "tunnel" geometry of FIG. 1. A number of additional geometries are of interest. Investigation of additional geometries should provide more information with regard to the possible scope, feasibility, and applicability of alternative arrangements of the invention.

Basic Bistatic SAR (Synthetic Aperture Radar) Via Exploitation of Multiple Low-Altitude UAV Plafforms A "Basic Bistatic SAR" system can be considered a "baseline" concept. For example, if a number of low-altitude UAVs collect data over a particular ground scene and each of the low-altitude UAVs are oriented at a different aspect angle with respect to the scene, each UAV can be designed to transmit the resulting data to a high-altitude platform. A three-dimensional multi-look SAR image can be potentially computed over the discrete set of integration angles that are associated with the low-altitude UAV platforms. This SAR image can be exploited via the development of image-based ATR-type (Automatic Target Recognition) algorithms. Then, for example, the low-altitude UAVs can be deployed in a close-range monostatic mode to interrogate regions with obscured targets.

It is perhaps worth mentioning that the concept introduced in sections 1 and 2 as well as the additional concepts in this section are also potentially compatible with multi-UAV SAR image formation schemes. These additional concepts employ differential path length estimation as part of the data collection scheme and it is possible to develop these systems in an effort to isolate obscured regions by avoiding some of the difficulties associated with image (amplitude) based detection along with the large processing overhead that may be associated with forming large SAR images in real time.

Horizontal Cavity Embedded in Ground Plane

Figure 6:
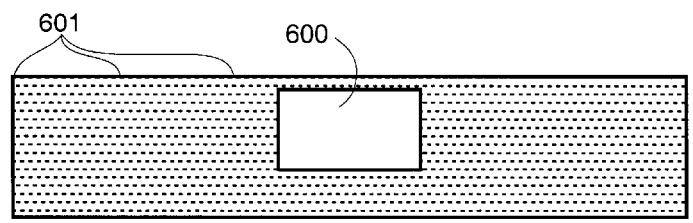
FIG. 6 shows an embedded cavity for purposes of differential path length analysis.

FIG. 6 depicts a geometry such that a cavity 600 is embedded a short distance below the ground, represented at 601. This geometry may have possible implications with regard to future GPR (ground penetrating radar) research. Trends in the differential path length as a function of look-angle can be investigated by modeling this cavity as a multi-slab wave guide with multiple discontinuities. Other straightforward (joint analytical and numerical) techniques can be modified for purposes of initiating this type of analysis.

Vertically-Oriented Cavity on Slant Plane

Figure 7:
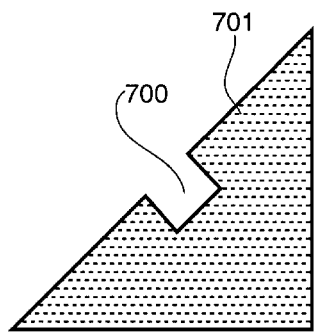
FIG. 7 shows a vertically oriented cavity on slant plane for purposes of differential path length analysis.

A vertically-oriented cavity 700 of a slant plane 701 geometry is depicted in FIG. 7. This geometry is a candidate for techniques that can be modified to initiate an approximate analysis for purposes of differential path length exploitation. Also, it is possible to formulate a number of "permutations" with respect to this geometry that result in additional relatively simple geometries for purposes of analysis.

Network of Paths and Junctions Associated with Urban Structures

Figure 8:
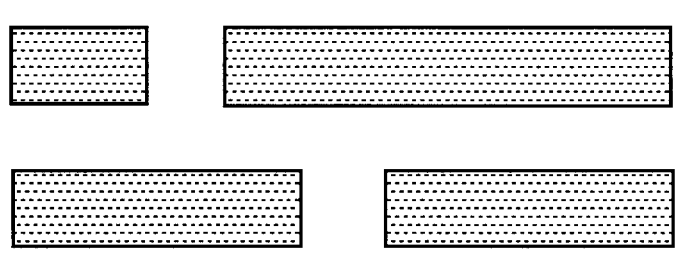
FIG. 8 shows a diagram illustrating sample geometry for purposes of differential path length analysis in urban environment.
Figure 9:
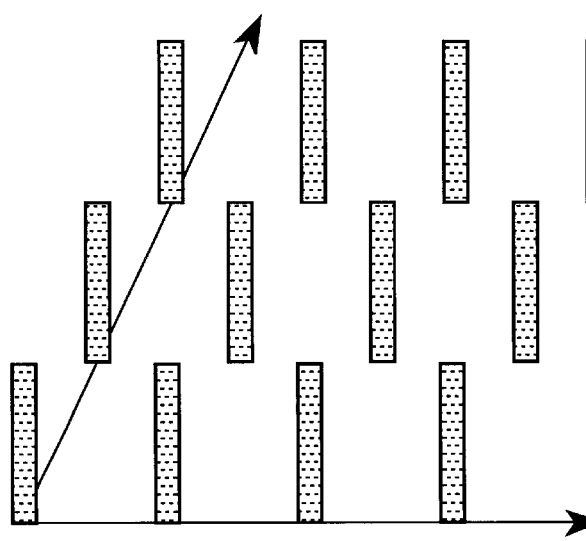
FIG. 9 shows an array of cylinders for purposes of investigating trends in differential path length for forest clutter.

FIG. 8 shows a network of paths and junctions associated with urban structures. FIG. 8 shows a diagram that is intended to depict a top view of a sample urban environment. Differential path length analysis may be accomplished in this area by modeling as "multi-junction" wave guides. These types of scenarios show good potential for a certain amount of joint differential path length combined with multi-static SAR exploitation with multiple low-altitude UAVs.

Array of Vertical Cylinders

Trends in the scattering from a vertical array of cylinders can be investigated for purposes of simulating forest clutter. A differential path length analysis scheme may cause a low-altitude UAV to converge to a region that is directly above two cylinders that are at a minimum distance from the UAV. Another possible analysis include "mode filtering" schemes that may allow a system of low-altitude UAVs to detect line-of-sight to targets at a variety of slant angles.

SUMMARY

The novel bistatic radar concept of the invention is compatible for investigating the employment of a high-altitude UAV that works in tandem with a group of low-altitude UAVs. At present, this concept is divided into a position-adaptive bistatic mode and a close-range monostatic mode. In position-adaptive (robotic) bistatic mode, each low-altitude UAV estimates a new parameter denoted as the differential path length to adaptively implement self-adjustments in position. This approach provides each UAV with the potential for looking down the "throat" of an obscuration channel. In the event that a particular low-altitude UAV detects an obscuration channel, the low-altitude UAV will transfer to a close-range monostatic mode in an effort to interrogate the obscuration channel for targets.

The present invention is a catalyst for additional areas of research and development. For example, analysis of basic clutter research with regard to potential systems that exploit the concept of differential path length. Analysis of the relationship between the "density" of clutter in relation to signal frequency, relative platform locations, and other system parameters may allow for the reduction of shadow regions. Also, consideration of detailed high-fidelity simulations and measurements in order to gain a better understanding for other critical parameters and phenomena such as the characterization of near-field effects and effective radiation patterns from aperture slots that are contained within the obscuration channels and serve as openings. Finally, investigation of system designs based on differential path length estimation between several propagating modes, in addition to differential path length estimation between the transmitter and the receiver for a single dominant mode.

While the apparatus and method described herein constitutes a preferred embodiment of the invention, it is to be understood that the invention is not limited to this precise form of apparatus or method and that changes may be made therein without departing from the scope of the invention which is defined in the appended claims.

I claim:

1. A multi-mode, radar method for detecting targets in difficult and obscured environments comprising the steps of:
   transmitting a signal through a channel from a high altitude unmanned air vehicle;
   passively receiving said signal from said transmitting step through a plurality of unmanned air vehicles at a low altitude platform relative to said unmanned air vehicle from said transmitting step,
   determining a differential signal time delay from a time said signal is transmitted at said transmitting step and a time said signal is received at said receiving step, said differential time delay indicating a differential time path obstruction between said high altitude unmanned air vehicle and said unmanned air vehicle at said low altitude platform;
   monitoring said signal time delay by said low altitude platform unmanned air vehicles and converging to a point that corresponds to a minimum time delay; and
   detecting targets within said differential time path at said point of minimum time delay by an unmanned air vehicle at a low altitude platform.

2. The multi-mode, radar method of claim 1 for detecting targets in difficult and obscured environments wherein said transmitting step further comprises transmitting a signal through a rectangular wave guide channel from a high altitude unmanned air vehicle.

3. The multi-mode, radar method of claim 1 for detecting targets in difficult and obscured environments wherein said transmitting step further comprises transmitting a signal through a horizontal cavity embedded in a ground plane wave guide channel from a high altitude unmanned air vehicle.

4. The multi-mode, radar method of claim 1 for detecting targets in difficult and obscured environments wherein said transmitting step further comprises transmitting a signal through a vertically oriented cavity on a slant plane wave guide channel from a high altitude unmanned air vehicle.

5. The multi-mode, radar method of claim 1 for detecting targets in difficult and obscured environments wherein said transmitting step further comprises transmitting a signal through an array of vertical cylinders wave guide channel from a high altitude unmanned air vehicle.

6. The multi-mode, radar method of claim 1 for detecting targets in difficult and obscured environments wherein said transmitting step further comprises transmitting a signal through a network of paths and junctions associated with urban structures wave guide channel from a high altitude unmanned air vehicle.

7. The multi-mode, radar method of claim 1 for detecting targets in difficult and obscured environments further comprising the step of maintaining signal coherence between said transmitted and received signal.

8. The multi-mode, radar method of claim 7 for detecting targets in difficult and obscured environments wherein said step of maintaining signal coherence between said transmitted and received signal comprises synchronization methods that include sampling the direct path signal from the high-altitude UAV to the low-altitude UAV.

9. The multi-mode, radar method of claim 7 for detecting targets in difficult and obscured environments wherein said step of maintaining signal coherence between said transmitted and received signal comprises synchronization methods that include determining the location of the receiver with respect to the transmitter via GPS data.

10. A multi-mode radar system for environments with difficult and obscured targets comprising:

an irradiating unmanned air vehicle positioned at the first end of an open-ended wave guide;

a plurality of passive receiving unmanned air vehicles at a low altitude platform relative to said irradiating unmanned air vehicle and positioned at a second, opposing end of an open-ended wave guide, a signal from said irradiating unmanned air vehicle transmitted to and received by one or more of said plurality of passive receiving unmanned air vehicles; and processing means for determining a differential time delay from a time said signal is transmitted and a time said signal is received, said differential time delay indicating a differential time path obstruction.

11. The multi-mode radar system of claim 10 for environments with difficult and obscured targets further comprising monitoring means for determining a minimum differential time delay whereby said plurality of passive receiving unmanned air vehicles at a low altitude platform converge to detect a target.

12. The multi-mode radar system of claim 10 for environments with difficult and obscured targets further comprising an irradiating unmanned air vehicle positioned at the first end of an open-ended rectangular wave guide.

13. The multi-mode radar system of claim 10 for environments with difficult and obscured targets further comprising an irradiating unmanned air vehicle positioned at the first end of an open-ended horizontal cavity embedded in a ground plane wave guide channel.

14. The multi-mode radar system of claim 10 for environments with difficult and obscured targets further comprising an irradiating unmanned air vehicle positioned at the first end of a vertically oriented cavity on a slant plane wave guide channel.

15. The multi-mode radar system of claim 10 for environments with difficult and obscured targets further comprising an irradiating unmanned air vehicle positioned at the first end of an array of vertical cylinders wave guide channel.

16. The multi-mode radar system of claim 10 for environments with difficult and obscured targets of claim 10 further comprising an irradiating unmanned air vehicle positioned at the first end of a network of paths and junctions associated with urban structures wave guide channel.

17. The multi-mode radar system of claim 10 for environments with difficult and obscured targets further comprising means for maintaining signal coherence between said transmitted and received signal.

18. The multi-mode radar system of claim 10 for environments with difficult and obscured targets further comprising means for maintaining signal coherence between said transmitted and received signal.

19. The multi-mode radar system of claim 18 for environments with difficult and obscured targets further comprising maintaining signal coherence between said transmitted and received signal comprises synchronization methods that include sampling the direct path signal from the high-altitude UAV to the low-altitude UAV.

20. The multi-mode radar system of claim 18 for environments with difficult and obscured targets further comprising means for maintaining signal coherence between said transmitted and received signal comprises synchronization methods that include determining the location of the receiver with respect to the transmitter via GPS data.

* * * * *